United States Patent [19]

Vitringa

[11] Patent Number: 4,623,991
[45] Date of Patent: Nov. 18, 1986

[54] DELTA-SHAPED GEOPHONE SPRING

[75] Inventor: Frederick A. Vitringa, Quathiaski Cove, Canada

[73] Assignee: Geosource, Inc., Houston, Tex.

[21] Appl. No.: 676,729

[22] Filed: Nov. 30, 1984

[51] Int. Cl.⁴ .................. H04R 9/00; H04R 11/00; F16F 1/34
[52] U.S. Cl. .................. 367/133; 367/187; 267/161
[58] Field of Search ............ 367/182, 183, 184, 185, 367/186, 187; 267/158, 161, 181

[56] References Cited

U.S. PATENT DOCUMENTS

| 2,348,225 | 5/1944 | Petty | 267/161 |
|---|---|---|---|
| 2,751,573 | 6/1956 | Millington | 367/183 |
| 2,753,176 | 7/1956 | List | 267/160 |
| 3,020,767 | 2/1962 | Kistler | 267/160 |
| 3,602,490 | 8/1971 | Mueller et al. | 267/161 |
| 3,738,445 | 6/1973 | Wilson et al. | 367/183 |
| 3,890,606 | 6/1975 | Florian et al. | 367/183 |
| 3,994,483 | 11/1976 | Perucchi et al. | 267/160 |
| 4,152,692 | 5/1979 | McNeel | 367/183 |
| 4,238,845 | 12/1980 | Haggard et al. | 367/183 |
| 4,323,994 | 4/1982 | Coogler | 367/183 |
| 4,400,861 | 8/1983 | Parker | 261/161 |
| 4,458,344 | 1/1984 | Coogler | 367/183 |

Primary Examiner—Charles T. Jordan
Assistant Examiner—Brian S. Steinberger
Attorney, Agent, or Firm—Arnold, White & Durkee

[57] ABSTRACT

For use in geophones to support either the coil or the permanent magnet, a spring formed from a disc, said spring having an outer ring, an inner ring, and three legs connecting the outer and inner rings. The legs are equidistant from one another and substantially equal in length. The inner edge of each leg lies on an arc having a radius at least 1.25 times greater than the distance from the center of the spring to the inner edge of the leg at the point where the leg joins the inner ring. For each leg, the straight-line distance between the points where a leg joins the inner and outer rings is equal to or greater than the distance from the center of the spring to an outer edge of the outer ring.

6 Claims, 8 Drawing Figures

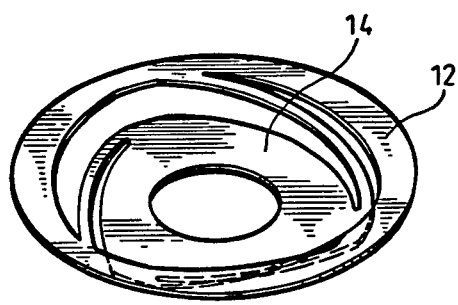
Fig. 1
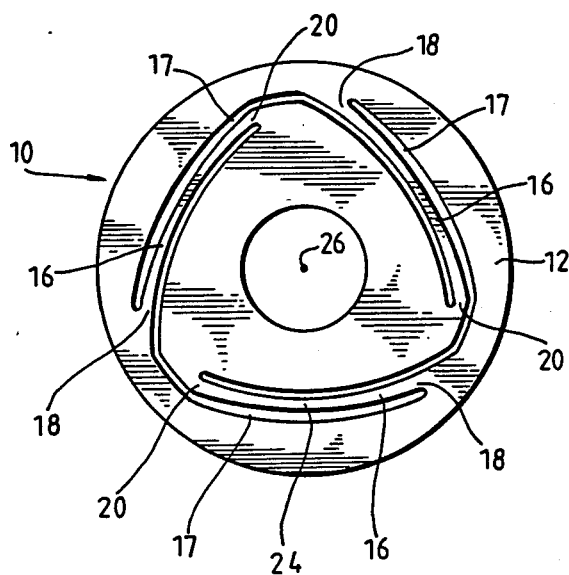
Fig. 7
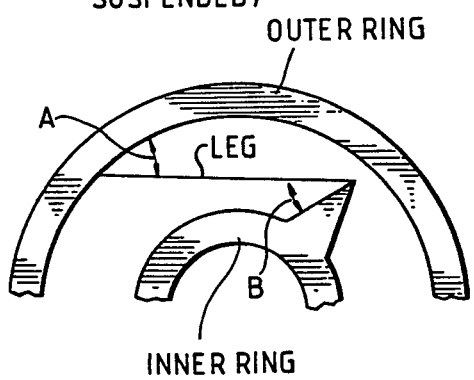
Fig. 2(a) (NO MASS SUSPENDED)
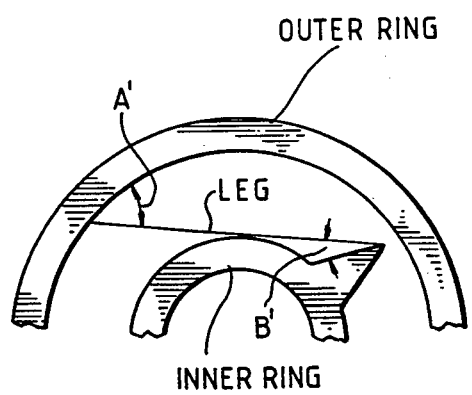
Fig. 2(b) (MASS SUSPENDED)

DELTA-SHAPED GEOPHONE SPRING

BACKGROUND OF THE INVENTION

1. Field of the Invention

This invention relates generally to geophones, and more particularly to suspension springs for geophones or seismometers.

2. Description of the Related Art

Geophones are devices which sense motion by suspending an inertial reference mass structure from a rigid, fixed supporting structure. Typically, the mass is a coil form suspended by springs in a magnetic field, one spring being attached at each end of the coil form. The springs position the coil form within the magnetic field so that the coil form is centered laterally and along its axis within the magnetic field. The springs also form a suspension system having a predetermined resonant frequency.

In seismic operations, seismic waves are imparted into the earth's crust at or near the earth's surface, and portions of those seismic waves are reflected or refracted from the boundaries of subsurface layers. Geophones are arranged in arrays or groups on the earth's surface, and when the reflected or refracted waves encounter a geophone, the coil form, which is suspended between the two springs, tends to stand still while the geophone housing and its connected magnetic circuit moves with the earth's surface. The movement of the coil form through a magnetic field causes a voltage to be generated at the output of the geophone. The outputs of the arrays of geophones are recorded in a form which permits analysis. Skilled interpreters can discern from the analysis the shape of subsurface formations, and the likelihood of finding an accumulation of minerals, such as oil and gas.

In present day geophones, spider springs are used extensively. Such springs are usually made from discs of spring material and have an inner ring and an outer ring which are connected by a plurality of legs. The legs are formed by etching or stamping the spring material in accordance with a predetermined pattern. Generally three such legs are used, and the three-legged arrangement is generally considered the most advantageous.

The legs of geophone springs generally have a rectangular cross-section and are curved along their lengths between the junctures with the inner and outer rings of the spring. After etching, the spring is "preformed" according to known techniques. When preforming is complete, the inner ring is offset or displaced relative to the outer ring, such that when a mass is suspended between two such springs, the inner ring, legs, and outer ring of each spring lie in the same plane.

A geophone is intended to sense motion from a direction which is roughly parallel to the axis of movement of the coil form with respect to the geophone housing. Therefore, it is desirable to eliminate or minimize the effects of any lateral motion of the coil form in response to forces which are not parallel to the axis of movement of the suspended coil form within the geophone.

In seismic operations, an impulse which is not truly parallel with the geophone axis and which contains a frequency component at or very near to that of the spurious frequency causes the geophone to produce an undesired or false EMF in the coils. Because of its high Q, the movement will continue for some time after the force which caused it has subsided. This resonance is considered to be the main spurious frequency in a geophone and it is highly undesirable as it limits the geophone's upper clean bandwidth.

Inasmuch as the geometry and the mass of the coil form for a given model of geophone are constant within manufacturing limits, the spurious resonance is also constant. The frequency of the spurious resonance can therefore be raised or lowered by changing the geometry of the suspension springs. This characteristic has been used to raise the frequency of these false signals until they are beyond the desirable frequency spectrum of the geophone by increasing the lateral stiffness of the spring. With this approach, these false signals do not interfere with or corrupt signals of interest. A common method of increasing the lateral stiffness of the spring is to shorten the spring legs. Unfortunately, the signal distortion caused by spring nonlinearity is increased when the legs are relatively short, and spring life is reduced.

In U.S. Pat. No. 4,323,994, there is disclosed a geophone spring whose legs have a straight segment. In U.S. Pat. No. 4,458,344 there is disclosed a geophone spring in which the flexural stress is equalized throughout the length of each leg by increasing the width of the leg at the portions of the leg experiencing the greatest moment.

It was desired to achieve much higher spurious resonant frequencies while still maintaining the linear response of the spring.

SUMMARY OF THE INVENTION

A geophone spring according to one embodiment of the present invention has an outer ring, an inner ring, and a plurality of legs connecting the inner and outer rings. In one form, the legs are formed by removing portions of the spring material according to a predetermined pattern, and in accordance with the invention, the length of the legs is maximized. The legs may be substantially straight or arcuate. The legs are substantially equal in length and disposed substantially equidistant from each other.

The present invention achieves a highly improved ratio of the spurious resonance of the spring to the natural frequency without deleterious effect to the linearity of the spring's response. This has been accomplished in part by an analysis which isolates the primary non-linear force acting in the spring. Then, structure has been designed specifically to counteract that nonlinear force, while at the same time increasing the lateral stiffness of the spring in order to have a high ratio of the spurious resonance of the spring to the natural frequency.

To counteract the non-linear force, in a preferred embodiment the width of each leg is tapered so that it is narrower at its middle than it is at either of its ends. This taper reduces the signal distortion caused by the nonlinear force exerted by the legs. This taper also reduces destructive stress which can appear at the junctures of each leg with the inner and outer rings. The non-linear force has also been reduced by making the legs as long as possible.

To improve the lateral stiffness, in a preferred form each leg is given as little curvature as possible, but is as straight as possible considering the architecture of the particular geophone to which the invention is applied. Thus for each leg, the radius of the arc forming the inner side of the leg is substantially greater and preferably at least 1.25 times greater than the distance from the center of the spring to the inner side of the leg, at the juncture point where the leg joins the inner ring.

A geophone spring in accordance with the present invention, when compared with previously used springs, has the advantage of an increased lateral stiffness of such a degree that the resulting spurious frequency is at least forty times greater than the natural frequency of the spring. This increase in the available clean bandwidth at the high frequency end is achieved without compromising the linearity of the spring.

BRIEF DESCRIPTION OF THE DRAWINGS

In the accompanying drawings

FIG. 1 is a perspective view of a geophone spring in a preformed state according to the present invention;

FIG. 2 is a planar view of part of a spring, viewed from above;

FIG. 7 is a planar view of a geophone spring according to the present invention;

DESCRIPTION OF THE PREFERRED EMBODIMENT

Geophone springs according to the present invention may be formed from spring material such as beryllium copper alloy by any suitable process, for example, by stamping out the spring configuration, by taking thin discs of an appropriate material and etching slots between the legs and rings, and so forth. The spring is then preformed so that the legs are permanently set in an upward bend from the inner ring and a downward bend from the outer ring. That is, the outer ring is displaced above the plane of the inner ring. FIG. 1 shows a spring after preforming.

When a geophone spring is installed in a geophone, the mass suspended by the spring attempts to push the outer ring back down to the plane of the inner ring. When the outer ring is pushed down, the inner and outer rings must rotate slightly with respect to each other to allow the downward displacement of the outer ring. This rotation changes the angular relationship between the rings and each leg.

Figure 3:
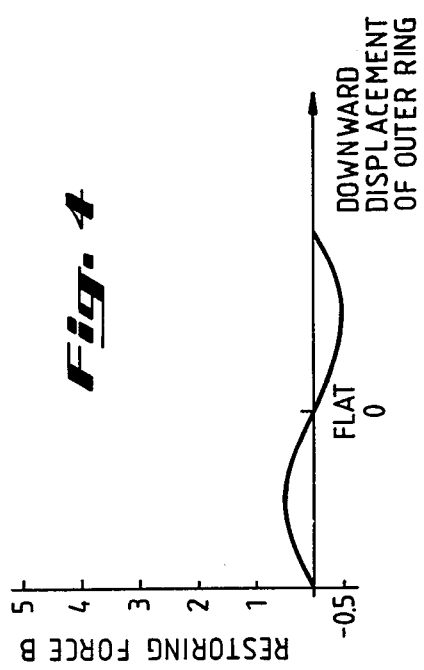
FIG. 3 is a graph showing the primary linear restoring force in a spring.

The downward force of the mass is influenced primarily by two restoring forces in the spring. The restoring force A is a force which the legs exert against the lowering of the outer ring. As shown in FIG. 3, restoring force A is linear, within a limited distance about the flat position of the spring, with respect to the downward displacement of the outer ring.

FIG. 2(a) shows the planar relationship of the outer ring, leg, and inner ring of a spring in the preformed state, viewed from above, before a mass exerts downward pressure on the outer ring.

FIG. 2(b) shows the changes that occur when a mass exerts a downward force on the outer ring. The angle A before the mass is suspended is less than the angle A' after the mass is suspended. In contrast, angle B before suspension is greater than angle B' after suspension.

Figure 4:
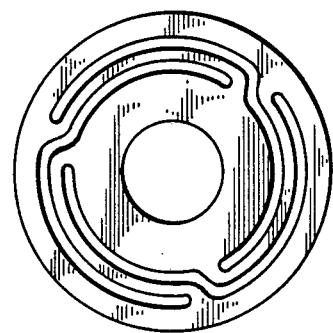
FIG. 4 is a graph showing the primary non-linear restoring force in a spring.

Restoring force B is a force which the legs exert in an attempt to return to the same angular relationship with the inner and outer rings that existed before the mass caused a downward displacement of the outer ring. Restoring force B is non-linear with respect to the downward displacement of the outer ring. FIG. 4 shows the non-linear restoring force B.

Figure 5:
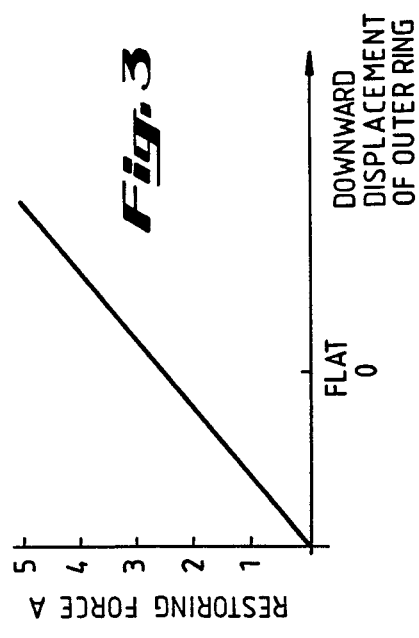
FIG. 5 is a graph showing the combination of the linear and non-linear restoring forces.

FIG. 5 shows a resultant force C which is the combination of the restoring forces A and B. The resultant force C which is the combination of forces A and B is substantially linear for a short distance X of displacement above and below the flat position of the spring. The strength, or amplitude, of force B determines the distance X and therefore the linearity of the resultant force C. The longer the distance X, the greater the amplitude of movement of the earth's surface the geophone can transduce, and thus the greater the dynamic range of the geophone.

In FIG. 7 the preferred spring configuration is shown in planar view. A spring 10 includes an outer ring 12 connected to an inner ring 14 by three legs 16. These parts of the spring 10 are formed by removing the areas designated 17 from the disc by suitable means, e.g., by etching. The legs 16 are each curved about the center 26 of the spring 10, extending from a juncture point 18 on the outer ring 12 to a juncture point 20 on the inner ring 14. The three legs are substantially equal in length and are disposed substantially equidistant from each other.

To reduce the effect of force B, each leg 16 tapers somewhat in its width from each juncture point 18, 20 to the center 24 of each leg, so that the center 24 is narrower than the juncture points 18, 20. Depending on the amount of the taper, the leg 16 can flex in a lateral direction. The lateral flexing of the leg 16 absorbs some of the non-linear restoring force B, thus reducing the non-linearity of the geophone's output signal.

Figure 6:
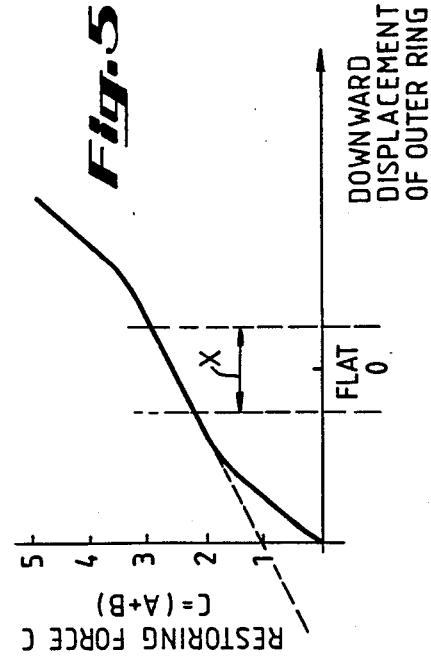
FIG. 6 is a planar view of a prior art geophone spring.

Referring to FIG. 6, a typical prior art spring is shown. As can be seen, the legs of the prior art spring exhibit an excessive amount of curvature. If the capability for lateral flexing is great, then it can be readily seen that a curved beam will flex more easily than a substantially straight beam. Therefore a curved beam increases lateral compliance and decreases the spurious frequency, which is undesirable. Thus, in a preferred embodiment of the present invention, to limit the lateral flexing, the legs have been designed to be substantially straight.

Referring to FIG. 7 the spring has been designed so that before the spring is preformed, that is, when it is flat, the inner edge of each leg 16 lays substantially on an arc having a radius at least 1.25 times greater than the distance from the spring center 26 to the inner edge of the leg at the juncture point 20.

The non-linear restoring force B has also been reduced in another way. Referring to the preformed spring shown in FIG. 1, a longer leg 16 will subtend a smaller angle from the plane of the rings for an equal amount of preform. The smaller the angular relationship between the rings and the leg 16, the less the amount of force B. Therefore, given a particular size of disc from which the spring is formed, the legs have been made as long as possible in order to reduce force B.

The foregoing description of the invention has been directed in primary part to a particular preferred embodiment in accordance with the requirements of the patent statute and for purposes of explanation and illustration. It will be apparent, however, to those skilled in this art that many modifications and changes in this specific device may be made without departing from the scope and spirit of the invention.

It is applicant's intention in the following claims to cover such modifications and variations as fall within the true spirit and scope of the invention.

What is claimed is:

1. A geophone spring which comprises:
   (a) an outer ring;
   (b) an inner ring; and
   (c) a plurality of legs connecting the outer and inner rings, the legs being curved about the center of the spring and extending from a juncture point on the outer ring to a juncture point on the inner ring, and when the spring is flat an inner edge of each leg lying substantially on an arc having a radius at least 1.25 times greater than the distance from the center of the spring to the inner edge of the leg at the juncture point where the leg joins the inner ring.

2. The spring of claim 1 wherein it comprises three legs of substantially equal length.

3. The spring of claim 1 wherein each leg is tapered to be wider at its ends that it is in its middle.

4. A spring which is formed from a disc for use in geophones comprising:
   (a) an outer ring;
   (b) an inner ring; and
   (c) three legs connecting the outer and inner rings, the legs being curved about the center of the spring and extending from a juncture point on the outer ring to a juncture point on the inner ring, the legs being equidistant from one another, and wherein;
   (1) each leg is substantially equal in length;
   (2) when the spring is flat, an inner edge of each leg lies substantially on an arc having a radius at least 1.25 times greater than the distance from the center of the spring to the inner edge of the leg at the juncture point where the leg joins the inner ring;
   (3) a straight line distance between the juncture points where each leg joins the inner and outer rings is equal to or greater than the distance from the center of the spring to an outer edge of the outer ring; and
   (4) each leg is wider at its ends than it is in its middle.

5. A spring for use in geophones comprising:
   (a) an outer ring;
   (b) an inner ring; and
   (c) three legs connecting the outer and inner rings, the legs being curved about the center of the spring and extending from a juncture point on the outer ring to a juncture point on the inner ring, the legs being equidistant from one another, and wherein:
   (1) each leg is substantially equal in length,
   (2) when the spring is flat, an inner edge of each leg lies substantially on an arc having a radius at least 1.25 times greater than the distance from the center of the spring to the inner edge of the leg at the juncture point where the leg joins the inner ring;
   (3) each leg is wider at its ends than it is in its middle.

6. In a geophone having a spring, the spring comprising:
   (a) an outer ring;
   (b) an inner ring;
   (c) a plurality of legs connecting the outer and inner rings, the legs being curved about the center of the spring and extending from a juncture point on the outer ring to a juncture point on the inner ring, the legs being equidistant from each other;
   (d) when the spring is flat an inner edge of each leg lying substantially on an arc having a radius substantially greater than the distance from the center of the spring to the inner edge of the leg at the juncture point where the leg joins the inner ring; and
   (e) each leg is tapered to be wider at its ends than in its middle.

* * * * *